April 3, 1962   A. FERRARI, JR   3,028,224
ANALYSIS OR OTHER PROCESSING OF GASEOUS FLUIDS
Filed Feb. 17, 1958   2 Sheets-Sheet 1

INVENTOR.
Andres Ferrari, Jr.
BY

ATTORNEYS

April 3, 1962     A. FERRARI, JR     3,028,224
ANALYSIS OR OTHER PROCESSING OF GASEOUS FLUIDS
Filed Feb. 17, 1958     2 Sheets-Sheet 2

INVENTOR.
Andres Ferrari, Jr.
BY
ATTORNEYS

United States Patent Office 3,028,224
Patented Apr. 3, 1962

3,028,224
ANALYSIS OR OTHER PROCESSING OF GASEOUS FLUIDS
Andres Ferrari, Jr., Scarsdale, N.Y., assignor to Technicon Instruments Corporation, Chauncey, N.Y., a corporation of New York
Filed Feb. 17, 1958, Ser. No. 715,775
18 Claims. (Cl. 23—232)

The present invention relates to methods of an apparatus for treating gases for analysis or other purposes.

In certain industrial, manufacturing and chemical processes, various dangerous gases, for example, hydrogen cyanide gas (HCN), hydrogen chloride gas (HCl), etc., which are produced or evolved require treatment, analysis or control in order, among other things, to obviate or sufficiently reduce the consequent health hazards or other intolerable conditions, especially where such gas is vented to the atmosphere or otherwise discharged to waste or for disposal.

One of the objects of the present invention is to facilitate the analysis of gases in respect to a particular ingredient thereof, for example but without limitation, HCN or HCl, continuously or at desired times during the industrial or other operation in the course of which such gas is produced or evolved, whereby to facilitate the monitoring operation for eliminating or sufficiently reducing the above indicated health hazard.

Another object of the invention, pursuant to another aspect thereof, is the provision of improved means for and a method of separating a particular gas from other gases for analysis or other purposes.

Another object of this invention is to provide means for and a method of processing gases or other fluids for analysis or other purposes, involving the use of apparatus having tubular passages, in such manner that a self-cleansing action of such passages results from the flow of the gaseous fluids through the passages.

The above and other objects, features and advantages of this invention will be more fully understood from the following description considered in connection with the accompanying illustrative drawings, in which.

Figure 1:
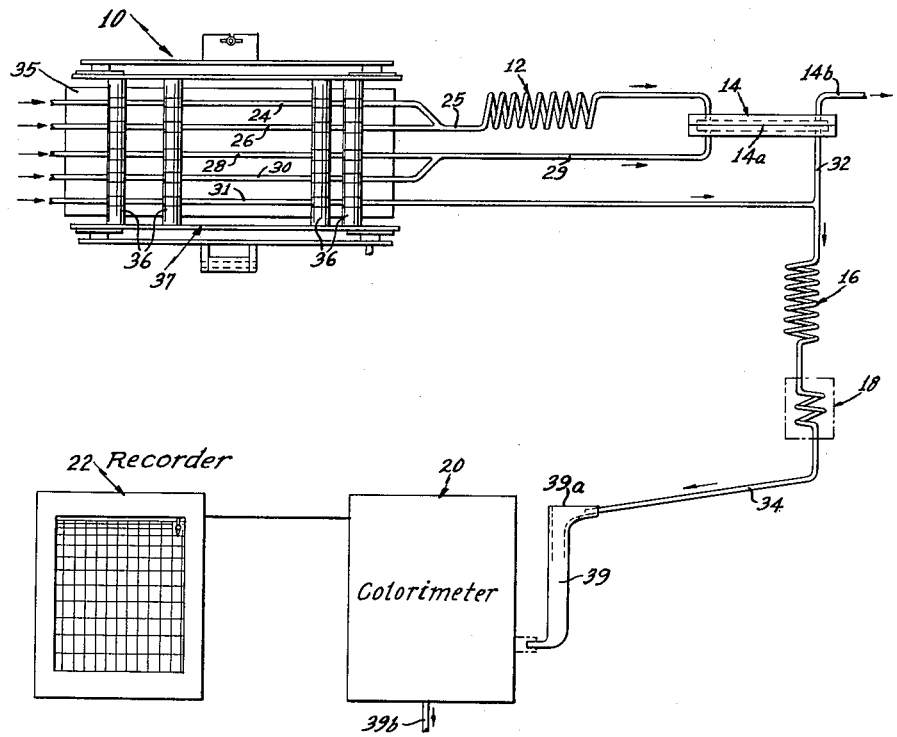
FIG. 1 is a more or less diagrammatic view of apparatus utilized in accordance with the present invention and is also a flow diagram for illustrating one of the methods of this invention.

Referring first to FIG. 1 of the drawings, illustrative of a method of the present invention for the analysis or other treatment of a gaseous fluid in respect to the hydrogen cyanide gas (HCN) content thereof, the apparatus utilized in this method comprises a proportioning pump 10, a helical coil 12 of tubing, preferably of glass, a dialyzer 14, a helical mixing coil 16, also of glass, a heating bath 18, a colorimeter 20, of the flow cell and phototube type, a recorder 22 of the self-balancing, slide wire type operable under the control of the photo-tube of the colorimeter, and the tubing 24, 25, 26, 28, 29, 30, 31, 32 and 34 which form the tubular passages or conduits for the various gaseous and liquid fluids which participate in the process. Apparatus of this general type is shown and described in the United States patent to Skeggs, No. 2,797,149, and certain parts of the apparatus illustrated by the drawings of this application will be more specifically described in the course of the descriptions of the methods of the present invention.

Figure 2:
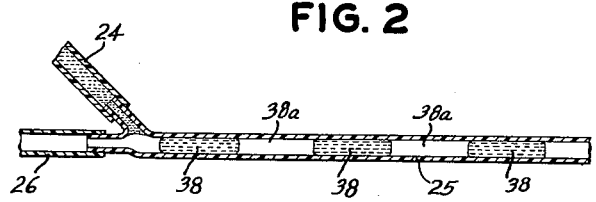
FIG. 2 is a view, on a larger scale, of a tubular part of the apparatus, and illustrates the action of the gas under analysis in dividing the fluid stream into alternate segments of the gas and a processing liquid.

In accordance with the method illustrated by FIG. 1, a gaseous fluid which is to be analyzed in respect to its HCN gas content is pumped through the tube 24 of the proportioning pump 10 into a tube 25, and a reagent or processing liquid, namely an alkali metal hydroxide, preferably sodium hydroxide (NaOH) is pumped through the tube 26 of said pump 10 into tube 25 which is connected to the mixing and delay coil 12. As illustrated in FIG. 2, the introduction of the gas into tube 25 into which the liquid reagent is pumped results in the formation of a fluid stream in conduit 25 comprising a series of liquid segments 38 separated by intervening segments 38a of gaseous fluid. This segmented fluid stream passes through the coil 12 of tubing and thence through the dialyzer 14 at one side of the dialyzer membrane indicated at 14a and is exhausted through the outlet 14b. Concurrently with the flow of said fluid stream through the dialyzer, a second fluid stream is pumped by pump 10 through the dialyzer at the other side of said membrane. Said second fluid stream comprises sodium hydroxide and air supplied by the pump tubes 28 and 30 to tube 29. The introduction of air into tube 29 divides the fluid stream into a series of liquid segments of NaOH separated from each other by air segments substantially in the same way as described above with reference to FIG. 2 in the case of the HCN gas and NaOH liquid segments.

In flowing through the conduit which comprises tube 25 and tubular coil 12, at least some of the HCN gas combines with the sodium hydroxide to form sodium cyanide and water. Coil 12 acts as a delay device to increase the length of time during which the HCN gas is subjected to treatment with NaOH and thereby increases the quantity of sodium cyanide formed during the flow of the stream through tube 25 to the dialyzer. In the dialyzer 14 which also comprises tubular passages at both sides of the membrane, as described for example in the United States Patent No. 2,864,507, the proportionate quantity of NaCN is increased as a result of the prolonged contact of the HCN gas with the NaOH at the first mentioned side of the membrane and also, as a result of the contact of the HCN at or in the pores of the dialyzer membrane with the sodium hydroxide which is supplied to the dialyzer through tube 29 and is therefore present at the other side of the membrane and in the pores thereof for intimate contact with the hydrogen cyanide gas.

It will be noted that the dialyzer as used pursuant to this invention constitutes an effective gas and liquid contact apparatus for bringing the HCN gas into intimate contact with the reagent for forming a liquid containing a cyanide salt, namely NaCN, and at the same time dialyzer membrane serves to prevent contaminants, which are ordinarily present in the gas and which would interfere with the colorimetric analysis or control device, from passing into the fluid stream at said other side of the dialyzer.

The fluid stream comprising liquid segments NaCN in water separated by intervening air segments flows from the dialyzer, through tube 32 to the mixing coil 16 in which the liquid is mixed with a suitable color developing reagent, preferably a conventional alkaline picrate reagent, supplied by the pump tube 31 to the inlet end of mixer 16. The fluid stream including the liquid thus mixed with the color developing reagent then flows through the heating bath 18 operated at temperature of 95° C., and from the latter the fluid stream passes through the colorimeter 20 in relation to a photo-tube or photoelectric cell therein which controls the operation of the recorder on which a continuous quantitative record of the HCN gas present in the gas supplied to tube 24 is made, pursuant to the calibration of the chart paper of the recorder. The outlet from the flow cell of the colorimeter is indicated at 39b.

It is to be noted that in accordance with the present invention, accurate quantitative analysis of the gas supplied to tube 24 in respect to HCN gas is accomplished without requiring that all of the HCN content in the gas react with the reagent, for the present process provides automatically a proportionate analysis which is accurately representative of the absolute volume of the HCN gas content in the source material.

The following is a non-limitative example of the above described method, in respect to the proportions of fluids supplied by the proportioning pump 10. The gaseous fluid to be analyzed or treated in respect to the HCN gas content thereof is pumped through tube 24 at the rate of 0.7 ml. per minute; the sodium hydroxide (1 N) is supplied by the pump tube 26 at the rate of 2 ml. per minute; the sodium hydroxide is supplied to the dialyzer by pump tube 28 at the rate of 2 ml. per minute; the air is supplied by the pump tube 29 at the rate of 1 ml. per minute; and the alkaline picrate reagent is supplied by tube 31 at the rate of 0.7 ml. per minute. It will be understood that potassium hydroxide can be used instead of sodium hydroxide and that any operative color-developing reagent may be used instead of the designated picrate reagent.

The proportioning pump 10 is preferably of the type described in the United States application filed by me and Jack Isreeli, Ser. No. 676,086, filed August 5, 1957. Essentially, it comprises a plurality of tubes, here shown as tubes 24, 26, 28, 30, 31, which are resiliently flexible and which are compressed progressively along their lengths simultaneously against a platen 35 by a plurality of pressure rollers 36 carried by an endless conveyor 37 and moved by the latter longitudinally of the tubes. The tubes have internal diameters which may be the same or different according to the required metering of the fluids pumped therethrough, respectively. Said tubes have the same wall thickness, however, in order that they may be fully compressed simultaneously by the pressure rollers, irrespective of the internal diameters of the tubes.

It is to be noted that the air introduced into tube 28 serves to prevent the formation of deposits on the walls of the tubular passages through which the fluid pass. This air is eliminated by the air vent opening 39a of the blending vessel 39 before the fluid stream enters the colorimeter. A blender suitable for this purpose is described in the United States application, Ser. No. 607,122, filed by me and Edwin C. Whitehead, August 30, 1956. In said blender, the liquid segments, free of intervening air, are consolidated into a solid liquid stream for passage through the cuvette or flow cell of the colorimeter.

It is to be noted further that an advantageous feature of the present invention, pursuant to one of the above mentioned objects is that the operation of the method directly on the gaseous fluid containing the HCN gas by introducing said fluid in the apparatus in gaseous form instead of first introducing into a liquid results in directly segmentizing the fluid stream in tubing 25 and in the dialyzer passages without requiring the introduction of air for that purpose. The gas thus introduced into said tubing 25 serves not only to segmentize the fluid stream for improved mixing purposes but also provides the self-cleansing action of the tubular passages due to the action of the stream of gas segments in removing deposits which might otherwise form on the internal tubing walls.

In the practice of the above described method with reference to FIGS. 1 and 2, distilled water can be used in lieu of the alkali hydroxide which is supplied to conduit 26. In such case the water would not provide an initial quantum of the cyanide salt, but it would, like the sodium hydroxide, provide in conjunction with the gaseous material containing HCN result in the formation of a fluid stream in conduit 25 composed of alternate liquid and gas segments. In all other respects the process may be the same as previously described with reference to FIG. 1 of the drawings.

Figure 3:
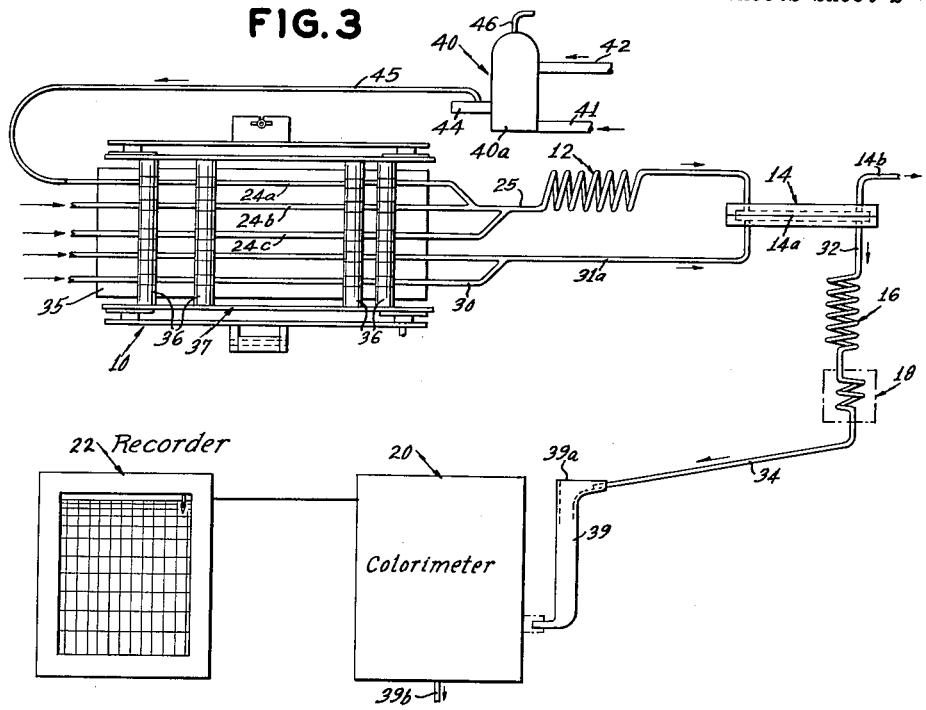
FIGS. 3 and 4 are views similar to FIG. 1, but showing the flow diagrams of other methods in accordance with the present invention.

In accordance with a modification of the above described method, the gaseous material containing hydrogen cyanide gas is pre-treated with sodium hydroxide to form a liquid containing sodium cyanide. This may be accomplished as illustrated in FIG. 3 by the use of any suitable gas and liquid contact apparatus indiacted diagrammatically at 40 which includes a tank 40a provided with an inlet 41 for the gaseous material, an inlet 42 for the stream of sodium hydroxide, an outlet conduit 44 for the liquid containing sodium cyanide, said outlet conduit 44 being connected to a point of disposal, and a sampling tube 45 connected to outlet conduit 44 for transmitting some of said liquid to tube 24a of the pump. Said tank 40a is also provided with a vent 46 for the exhaust of excess or residual gas from said tank. Said last mentioned liquid is pumped from tube 44 through the pump tube 24a into the conduit 25, and air is introduced through the pump tube 24b and divides the stream of liquid into alternate segments of liquid and air. Also, distilled water is introduced into conduit 25 by means of the pump tube 24c. In this process, it is unnecessary ot utilize a stream of sodium hydroxide at the opposite side of the dialyzer and in this case, the alkaline picrate reagent is pumped through the tube 31a into the diffusate side of the dialyzer instead of the sodium hydroxide which is pumped through the tube 31 in FIG. 1, and as here shown, the stream of the picrate reagent is segmentized by the introduction of air through the pump tube 30. The sodium cyanide which passes through the membrane 14a of the dialyzer is diffused into the stream of the alkaline picrate reagent and the resulting fluid stream flows through tube 32 into mixer 16. After leaving the mixer 16 the fluid stream is processed in the same way as described above with reference to FIG. 1. However, in the process carried out according to FIG. 3, the preferred proportions are as follows in terms of rate of flow of the substances pumped by the proportioning pump 10. The rate of flow of the liquid containing sodium cyanide supplied through tube 24a is 0.7 ml. per minute; the rate of flow of air in tube 24b is 0.7 ml. per minute; the rate of flow of distilled water in tube 24c is 2.0 ml. per minute; the rate of flow of the alkaline picrate reagent in conduit 31a is 2.5 ml. per minute; and the rate of flow of the air through tube 30 is 1.0 ml., per minute.

Figure 4:
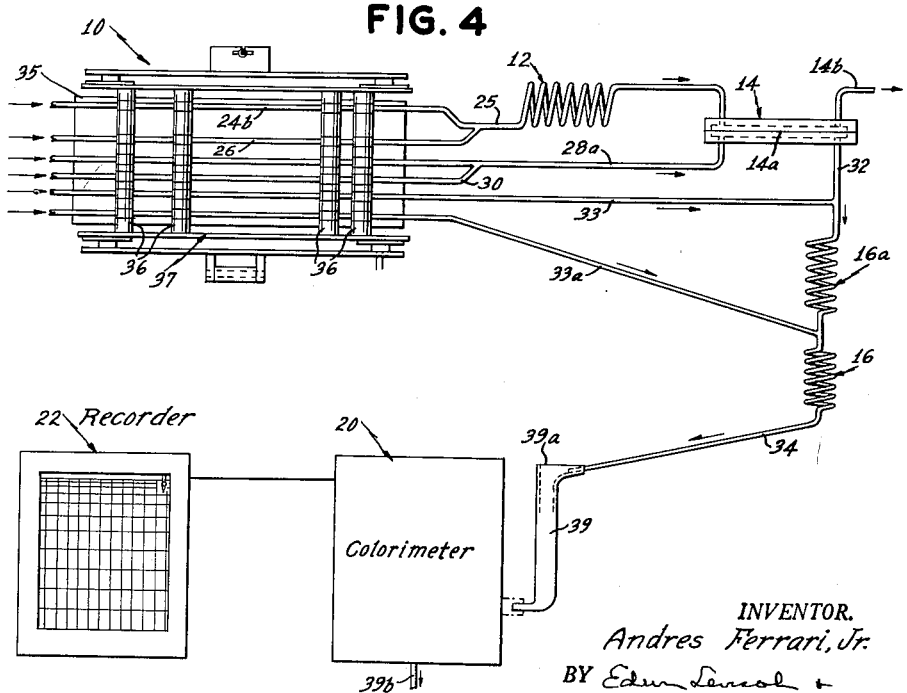

Referring now to FIG. 4, there is illustrated a method, according to the present invention, for analyzing a material in respect to the hydrogen chloride gas content thereof. In this case, the gaseous material containing the hydrogen chloride gas is pumped through tube 24b into conduit 25 together with sodium hydroxide pumped through tube 26, forming in this case a quantum of sodium chloride and water in the segmented liquid stream flowing in tubular conduit 25. In this connection, it will be understood that the introduction of the gaseous material containing the hydrogen chloride gas segmentizes the sodium hydroxide stream in the manner described above with reference to FIG. 2 and as the fluid stream composed of the gaseous and liquid segments flows through the delay coil 12 and through the dialyzer at one side of the membrane thereof the sodium chloride content of the liquid segments is increased. Water is supplied by the proportioning pump 10 to the other side of the dialyzer through tube 28a, said stream of water being segmented by air supplied through the pump tube 30. The sodium chloride which diffuses through the dialyzer membrane into the segmented stream of water flows from the dialyzer through tube 32 which includes the mixer coil 16a in addition to the previously mentioned mixer coil 16. In this case, two reagents are employed to develop the color in the fluid stream flowing through the tube 34 to the colorimeter. These reagents are a saturated solution of mercuric thyocyanate Hg(SCN)$_2$ supplied through tube 33 to the inlet end of mixer coil 16$a$ and a 6% ferric ammonium sulphate solution in 6 N-HNO$_3$ pumped through tube 33$a$ to the inlet end of the mixer coil 16. The action of these color developing reagents for the photometric determination of chlorides in water is described in Journal of Analytical Chemistry, vol. 28, No. 11, pp. 1665 to 1668, in a paper entitled "Photometric Determinations of Chlorides in Water," by David M. Zall, Donald Fisher, and Mary Quinn. It will be observed that in this case, the heating bath is unnecessary and is therefore omitted and instead the fluid stream emanating from the outlet end of the mixer coil 16 flows directly to the blending and venting vessel 39 associated with the colorimeter 20 which controls the operation of the recorder 22 as described above. In this process for the analysis or treatment of gaseous material containing hydrochloric acid gas, the various above mentioned substances are supplied by the proportioning pump 10 in accordance with the following preferred, but non-limiting example, in terms of rate of flow of the fluids, namely: hydrogen chloride gas, 0.7 ml. per minute; sodium hydroxide, 2.5 ml. per minute; Hg(SCN)$_2$, 1.0 ml. per minute; ferric ammonium sulphate solution in HNO$_3$, 1 ml. per minute; water, 2.0 ml. per minute; and air, 1 ml. per minute. It will be understood that in view of the present disclosure and as described above with reference to FIGS. 1 and 3, the hydrogen chloride gas may be pre-treated with sodium hydroxide to form a liquid containing sodium chloride and that in such case the liquid will be supplied to pump tube 24$b$ instead of hydrogen chloride gas and water will be pumped through tube 26 instead of NaOH, and air will be pumped into conduit 25 to segmentize the liquid stream as previously described, with reference to FIG. 3. Also, in such case, a stream of mercuric thyocyanate segmented by air will be supplied by the pump to the diffusate side of the dialyzer instead of the segmented water stream, for example, through tubes 28$a$ and 30 and tube 33 would be omitted.

While, as described above in detail, the liquid discharge from the dialyzer at the diffusate side thereof is subjected to analysis, as a processing operation, it will be understood that the diffusate may be utilized for controlling various other processing operations. For example, in the case of such toxic or potentially harmful gases as hydrogen cyanide gas and hydrogen chloride gas, the liquid diffusate from the dialyzer may be employed to control or monitor various manufacturing and discharge operations, valves, etc., whereby to prevent or reduce the discharge of such harmful substances into the atmosphere or into rivers or streams.

Thus it is seen that the above described methods and apparatus are well adapted to accomplish the indicated objects of the invention. It will be understood, however, that while I have shown and described the preferred embodiments of the invention, the latter may be practised otherwise than as herein illustrated or described without departing from the underlying principles of this invention within the scope of the appended claims.

Having thus described my invention, what I claim and desire to secure by Letters Patent is:

1. The method of processing a gaseous fluid in accordance with a selected ingredient thereof, comprising passing a stream of said gaseous fluid containing said ingredient and a stream of a liquid through a conduit in which said gaseous fluid sub-divides said liquid stream into a fluid stream comprising a series of spaced segments of said liquid with an intervening segment of said gaseous fluid between successive spaced liquid segments, concurrently passing said segmented stream through a dialyzer at one side of its membrane, concurrently passing through said dialyzer at the other side of said membrane, a stream of liquid into which said ingredient of said first mentioned stream is diffused in said dialyzer and reacts with said last mentioned liquid to form therein a compound representative of said ingredient, and concurrently quantitatively analyzing the stream of diffusate liquid, discharged from the dialyzer, in respect to said compound therein.

2. The method of processing a gaseous fluid containing an ingredient of the class consisting of hydrogen cyanide gas and hydrogen chloride gas, comprising passing said gaseous fluid in contact with a liquid containing an alkali metal hydroxide through a dialyzer and forming therein a liquid diffusate containing a salt in an amount proportional to the quantity of said ingredient in said gaseous fluid, concurrently discharging said diffusate liquid from the dialyzer, and concurrently analyzing the discharged diffusate liquid in respect to the quantity of said salt therein.

3. The method of processing a gaseous fluid containing an ingredient of the class consisting of hydrogen cyanide gas and hydrogen chloride gas, comprising passing said gaseous fluid in contact with a liquid containing an alkali metal hydroxide through a dialyzer and forming therein a liquid diffusate containing a salt in an amount proportional to the quantity of said ingredient in said gaseous fluid, concurrently discharging said diffusate liquid from the dialyzer, and concurrently operating a colorimeter and recorder under the control of the diffusate liquid discharged from the dialyzer for determining the quantity of said ingredient in said gaseous fluid.

4. The method of processing a gaseous fluid containing hydrogen cyanide gas, as an ingredient thereof, comprising passing said gaseous fluid in contact with a liquid containing an alkali metal hydroxide through a dialyzer and forming therein a liquid diffusate containing a cyanide salt in an amount proportional to the quantity of said ingredient in said gaseous fluid, concurrently discharging said diffusate liquid from the dialyzer, and concurrently analyzing the discharged diffusate liquid in respect to the quantity of said cyanide salt therein.

5. The method of processing a gaseous fluid containing hydrogen chloride gas as an ingredient thereof, comprising passing said gaseous fluid in contact with a liquid containing an alkali metal hydroxide through a dialyzer and forming therein a liquid diffusate containing a salt of hydrochloric acid in an amount proportional to the quantity of said ingredient in said gaseous fluid, concurrently discharging said diffusate liquid from the dialyzer, and concurrently analyzing the discharged diffusate liquid in respect to the quantity of said salt therein.

6. A method of processing a selected gas contained in a gaseous fluid, comprising transmitting said gaseous fluid and a liquid in a stream through a dialyzer at one side of the membrane thereof, and transmitting a second liquid through the dialyzer at the other side of the membrane thereof, said second liquid comprising a reagent which reacts with said selected gas and forms a liquid diffusate containing the reaction product of said selected gas and said reagent, said membrane of the dialyzer providing means for bringing said selected gas into intimate contact with said reagent in said second liquid for forming said reaction product.

7. A method of processing a selected gas contained in a gaseous fluid, comprising transmitting said gaseous fluid and a liquid in a stream through a tubular conduit including successively, in the direction of flow of said stream, a tube in which said gaseous fluid divides the liquid stream into a series of segments of said liquid separated from each other by intervening segments of said gaseous fluid and a tubular passage at one side of the membrane of a dialyzer in contact with said membrane, and transmitting a second liquid through a tubular passage at other side of said dialyzer membrane in contact with said other side of the membrane, said second liquid comprising a reagent which reacts with said selected gas and forms a liquid diffusate containing the reaction product of said selected gas and said reagent, said membrane of the dialyzer providing means for bringing said selected gas into intimate contact with said reagent in said second liquid for forming said reaction product.

8. A method according to claim 6, characterized in that said gaseous fluid includes hydrogen cyanide gas, and said second liquid includes a metal hydroxide which reacts with said hydrogen cyanide gas at said dialyzer membrane and forms a liquid diffusate containing a metal cyanide quantitatively representative of the quantity of the hydrogen cyanide gas in said gaseous fluid.

9. A method according to claim 7, characterized in that said gaseous fluid includes hydrogen cyanide gas, and said second liquid includes a metal hydroxide which reacts with said hydrogen cyanide gas at said dialyzer membrane and forms a liquid diffusate containing a metal cyanide quantitatively representative of the quantity of the hydrogen cyanide gas in said gaseous fluid.

10. A method according to claim 6, characterized in that said gaseous fluid includes as an ingredient a gas of the group consisting of hydrogen cyanide gas and hydrogen chloride gas, and said second liquid includes a metal hydroxide which reacts with said ingredient of said gaseous fluid at said dialyzer membrane and forms a salt of said ingredient quantitatively representative of said ingredient gas in said gaseous fluid.

11. A method according to claim 7, characterized in that said gaseous fluid includes as an ingredient a gas of the group consisting of hydrogen cyanide gas and hydrogen chloride gas, and said second liquid includes a metal hydroxide which reacts with said ingredient of said gaseous fluid at said dialyzer membrane and forms a salt of said ingredient quantitatively representative of said ingredient gas in said gaseous fluid.

12. A method according to claim 6, characterized in that said gaseous fluid includes hydrogen chloride gas as an ingredient thereof, and said second liquid includes a metal hydroxide which reacts with said hydrochloric acid gas to form a salt thereof in said second liquid in a quantity representative of the quantity of said hydrogen chloride gas in said gaseous fluid.

13. A method according to claim 1, characterized in that said gaseous fluid includes hydrogen chloride gas as an ingredient thereof, and said second liquid includes a metal hydroxide which reacts with said hydrogen chloride gas to form a salt thereof in said second liquid in a quantity representative of the quantity of said hydrogen chloride gas in said gaseous fluid.

14. A method of processing a gas constituting an ingredient of a gaseous fluid, comprising transmitting a stream of said fluid through a dialyzer at one side of the membrane thereof in contact with said membrane, and concurrently transmitting through the dialyzer at the other side of said membrane in contact therewith a stream of a liquid containing a reagent which reacts with said ingredient of said gaseous fluid at the membrane of the dialyzer and forms a liquid diffusate containing the reaction product of said reagent and said gas ingredient of said gaseous fluid, said membrane providing means for bringing said gas ingredient of said fluid into intimate contact with said reagent in said liquid for forming said reaction product.

15. A method of processing a gaseous fluid containing an ingredient of the class consisting of hydrogen cyanide gas and hydrogen chloride gas, comprising forming a stream of said gaseous fluid, mixing said stream with a stream containing a processing liquid with which at least a portion of said ingredient reacts to form a salt of said ingredient therein, concurrently passing the resulting stream containing said salt through a dialyzer at one side of the membrane thereof, concurrently passing a stream of a diffusate liquid through said dialyzer at the other side of said membrane for receiving therein a quantity of the salt resulting from said reaction of said gaseous ingredient with said processing liquid in an amount proportional to the quantity of said ingredient in said first mentioned stream, mixing said diffusate liquid containing said salt with a color producing reagent for reaction therewith to produce a color indicative of the quantity of said salt in said diffusate, and colorimetrically examining said diffusate to determine the quantity of said ingredient in said first mentioned stream.

16. The method of processing a gaseous fluid with respect to an ingredient thereof, comprising passing a stream of said gaseous fluid into contact with a processing liquid with which at least a portion of said ingredient reacts to form a reaction product therein, concurrently passing a stream of fluid containing at least a portion of said reaction product through a dialyzer at one side of the membrane thereof, concurrently passing a stream of a liquid through said dialyzer at the other side of said membrane in contact with the surface of said membrane for providing a stream of diffusate containing therein a quantity of said reaction product, and concurrently analyzing said stream of diffusate in respect to said reaction product.

17. Apparatus for processing a gaseous fluid with respect to an ingredient thereof, comprising a vessel provided with inlets for said gaseous fluid and a processing liquid, respectively, and a liquid outlet, means for introducing said gaseous fluid and said processing liquid through said inlets, respectively, into said vessel wherein said gaseous fluid comes in contact with said processing liquid to form a resulting liquid containing the reaction product of said ingredient and said processing liquid and which is representative of the quantity of said ingredient in said gaseous fluid, liquid mixing means in fluid flow communication with said outlet, means for transmitting at least a portion of said resulting liquid in the form of a stream through said outlet to said mixing means, means for transmitting another liquid stream and a separate stream of an inert gas to said stream containing said resulting liquid during the flow of the latter to said mixing means to form a segmented stream containing a series of spaced liquid segments each containing said other liquid and said resulting liquid separated from each other by a series of intervening segments of said inert gas, whereby said mixing means is operable to mix the constituents of each liquid segment together, a dialyzer in fluid flow communication with said mixing means, means for transmitting said mixed segmented stream from said mixing means to said dialyzer at one side of the membrane thereof, means for concurrently transmitting a stream of a recipient liquid to said dialyzer at the other side of said membrane, to thereby provide a stream of diffusate containing therein a substance representative of the quantity of said reaction product in said resulting liquid, and means in fluid flow communication with said dialyzer for concurrently analyzing said stream of diffusate in respect to said substance to obtain a measurement which indicates the quantity of said ingredient in said gaseous fluid.

18. Apparatus for processing a gaseous fluid with respect to an ingredient thereof, comprising a vessel provided with an inlet for the gaseous fluid, another inlet for a processing liquid which reacts with said ingredient to form a reaction product, a liquid outlet for transmitting at least a portion of the resulting liquid containing said reaction product from said vessel, another liquid outlet for transmitting excess liquid containing said reaction product from said vessel, and a vent for venting said vessel, means for introducing said gaseous fluid and said processing liquid in the form of separate streams, respectively, into said vessel through their respective inlets wherein said gaseous fluid comes in contact with said processing liquid to form said resulting liquid containing said reaction product, a dialyzer, means for transmitting at least a portion of said resulting liquid through said first mentioned outlet to said dialyzer at one side of the membrane thereof, and means for concurrently transmitting a stream of a recipient liquid to said dialyzer at the other side of said membrane and thereby provide a stream of diffusate containing therein a quantity of a substance representative of the quantity of said reaction product in said resulting liquid, and means in fluid flow communication with said dialyzer for concurrently analyzing said stream of diffusate in respect to said substance to obtain a measurement which represents the quantity of said ingredient in said gaseous fluid.

References Cited in the file of this patent

UNITED STATES PATENTS

| | | |
|---|---|---|
| 1,229,305 | Menzies | June 12, 1917 |
| 1,825,024 | Tandberg | Sept. 29, 1931 |
| 2,111,808 | Saddington | Mar. 22, 1938 |
| 2,413,261 | Stackhouse | Dec. 24, 1946 |
| 2,417,877 | Lewis | Mar. 25, 1947 |
| 2,797,149 | Skeggs | June 25, 1957 |
| 2,823,985 | Strange | Feb. 18, 1958 |
| 2,899,280 | Whitehead | Aug. 11, 1959 |

OTHER REFERENCES

Morell: "Ind. and Eng. Chem., Analytical Ed.," 13 249–51 (1941).